(12) United States Patent
Pursifull et al.

(10) Patent No.: US 12,181,335 B2
(45) Date of Patent: Dec. 31, 2024

(54) METHODS AND APPARATUS TO CALIBRATE A WEIGHT ESTIMATION

(71) Applicant: Ford Global Technologies, LLC, Dearborn, MI (US)

(72) Inventors: Ross Dykstra Pursifull, Dearborn, MI (US); Rani Kiwan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/481,065

(22) Filed: Oct. 4, 2023

(65) Prior Publication Data

US 2024/0027257 A1   Jan. 25, 2024

Related U.S. Application Data

(63) Continuation of application No. 17/372,074, filed on Jul. 9, 2021, now Pat. No. 11,796,380.

(51) Int. Cl.
*G01G 19/12* (2006.01)
*B60G 21/05* (2006.01)
*G01G 23/01* (2006.01)
*G01B 7/16* (2006.01)

(52) U.S. Cl.
CPC ............. *G01G 23/01* (2013.01); *G01G 19/12* (2013.01); *B60G 21/051* (2013.01); *G01B 7/18* (2013.01)

(58) Field of Classification Search
CPC .... G01G 19/12; G01G 23/01; G01G 23/3728; G01B 7/18; B60G 21/051
See application file for complete search history.

(56) References Cited

U.S. PATENT DOCUMENTS

| | | | |
|---|---|---|---|
| 3,780,817 A * | 12/1973 | Videon | G01B 7/18 177/136 |
| 4,102,031 A * | 7/1978 | Reichow | G01G 19/12 29/464 |
| 4,623,029 A | 11/1986 | Bambauer | |
| 4,941,365 A | 7/1990 | Reiner | |
| 5,215,154 A | 6/1993 | Kirby | |
| (Continued) | | | |

OTHER PUBLICATIONS

Marek, "Does Car Tire Pressure Change with Weight of Car Load?," StackExchange, Physics, Aug. 28, 2014, URL:[https://physics.stackexchange.com/questions/132892/does-car-tire-pressure-change-with-weight-of-car-load#:~:text=TL%3BDR%3A%20The%20load%20does, and%20keeping%20rolling%20friction%20low], retrieved on Jun. 12, 2023, 15 pages.

(Continued)

*Primary Examiner* — Randy W Gibson
(74) *Attorney, Agent, or Firm* — Lorne Forsythe; Hanley, Flight & Zimmerman, LLC

(57) ABSTRACT

Methods, apparatus, systems and articles of manufacture to calibrate a weight estimation are disclosed herein. An example apparatus comprises memory including stored instructions, and a processor to execute the instructions to determine, via a first sensor, a first load estimation of a vehicle corresponding to when the vehicle under a load condition, determine, via a second sensor, a second load estimation corresponding to when the vehicle is moving and under the load condition, and calibrate, based on a difference between the second load estimation and the first load estimation, an error of the first load estimation.

13 Claims, 9 Drawing Sheets

(56) References Cited

U.S. PATENT DOCUMENTS

| | | | |
|---|---|---|---|
| 5,681,998 | A | 10/1997 | Nakazaki |
| 5,849,120 | A * | 12/1998 | Drieux ................. B60G 21/051 |
| | | | 152/416 |
| 5,877,455 | A | 3/1999 | Kyrtsos |
| 5,973,273 | A | 10/1999 | Tal |
| 6,069,324 | A | 5/2000 | Shimizu |
| 6,449,582 | B1 | 9/2002 | Chaklader |
| 9,068,878 | B2 | 6/2015 | Cash |
| 11,561,124 | B2 | 1/2023 | Li |
| 11,796,380 | B2 | 10/2023 | Michelini et al. |
| 2003/0010106 | A1 * | 1/2003 | Mattmann .............. G01G 19/12 |
| | | | 73/146 |
| 2008/0271541 | A1 | 11/2008 | Neuman |
| 2009/0048790 | A1 * | 2/2009 | Geraghty ........... G01G 23/3728 |
| | | | 177/136 |
| 2014/0298923 | A1 | 10/2014 | Geldman |
| 2015/0217607 | A1 | 8/2015 | Singh |
| 2017/0370764 | A1 | 12/2017 | Xu |

OTHER PUBLICATIONS

Ligthendog Thom, "Does Tire Pressure Increase Under a Heavy Load," Youtube, 2016, URL:[https://www.youtube.com/watch?v=v0fE8nlt_bY], retrieved on Jun. 12, 2023, 2 pages.

United States Patent and Trademark Office, "Notice of Allowance and Fee(s) Due," issued in connection with U.S. Appl. No. 17/372,074, dated Jun. 13, 2023, 7 pages.

United States Patent and Trademark Office, "Notice of Allowability," issued in connection with U.S. Appl. No. 17/372,074, dated Sep. 21, 2023, 4 pages.

* cited by examiner

METHODS AND APPARATUS TO CALIBRATE A WEIGHT ESTIMATION

RELATED APPLICATION

This patent arises from a continuation of U.S. patent application Ser. No. 17/372,074, filed on Jul. 9, 2021 and entitled "METHODS AND APPARATUS TO CALIBRATE A WEIGHT ESTIMATION," which is incorporated herein by reference in its entirety.

FIELD OF THE DISCLOSURE

This disclosure relates generally to vehicles and, more particularly, to methods and apparatus to calibrate a weight estimation.

BACKGROUND

Some vehicles (e.g., vans, trucks, sports utility vehicles (SUVs), etc.) can carry significant loads and often have weight limits that should not be exceeded. As such, to ensure proper vehicle handling and/or performance during normal use, a vehicle should not be loaded (e.g., with people, cargo, freight, etc.) greater than a weight limit of the vehicle. A user of the vehicle can visually inspect the vehicle to determine if a vehicle is overloaded. Alternatively, a vehicle can be driven to a weight station to determine of a weight and/or load of the vehicle.

SUMMARY

An example apparatus comprises memory including stored instructions, and a processor to execute the instructions to determine, via a first sensor, a first load estimation of a vehicle corresponding to when the vehicle under a load condition, determine, via a second sensor, a second load estimation corresponding to when the vehicle is moving and under the load condition, and calibrate, based on a difference between the second load estimation and the first load estimation, an error of the first load estimation.

An example non-transitory computer readable medium comprises instructions, which, when executed cause a processor to determine, via a first sensor, a first load estimation of a vehicle corresponding to when the vehicle under a load, determine, via a second sensor, a second load estimation corresponding to when the vehicle is moving and under the load, and calibrate, based on a difference between the second load estimation and the first load estimation, an error of the first load estimation.

An example method comprises determining, via a first sensor, a first load estimation of a vehicle corresponding to when the vehicle under a load, determining, via a second sensor, a second load estimation corresponding to when the vehicle is moving and under the load, and calibrating, based on a difference between the second load estimation and the first load estimation, an error of the first load estimation.

Figure 1:
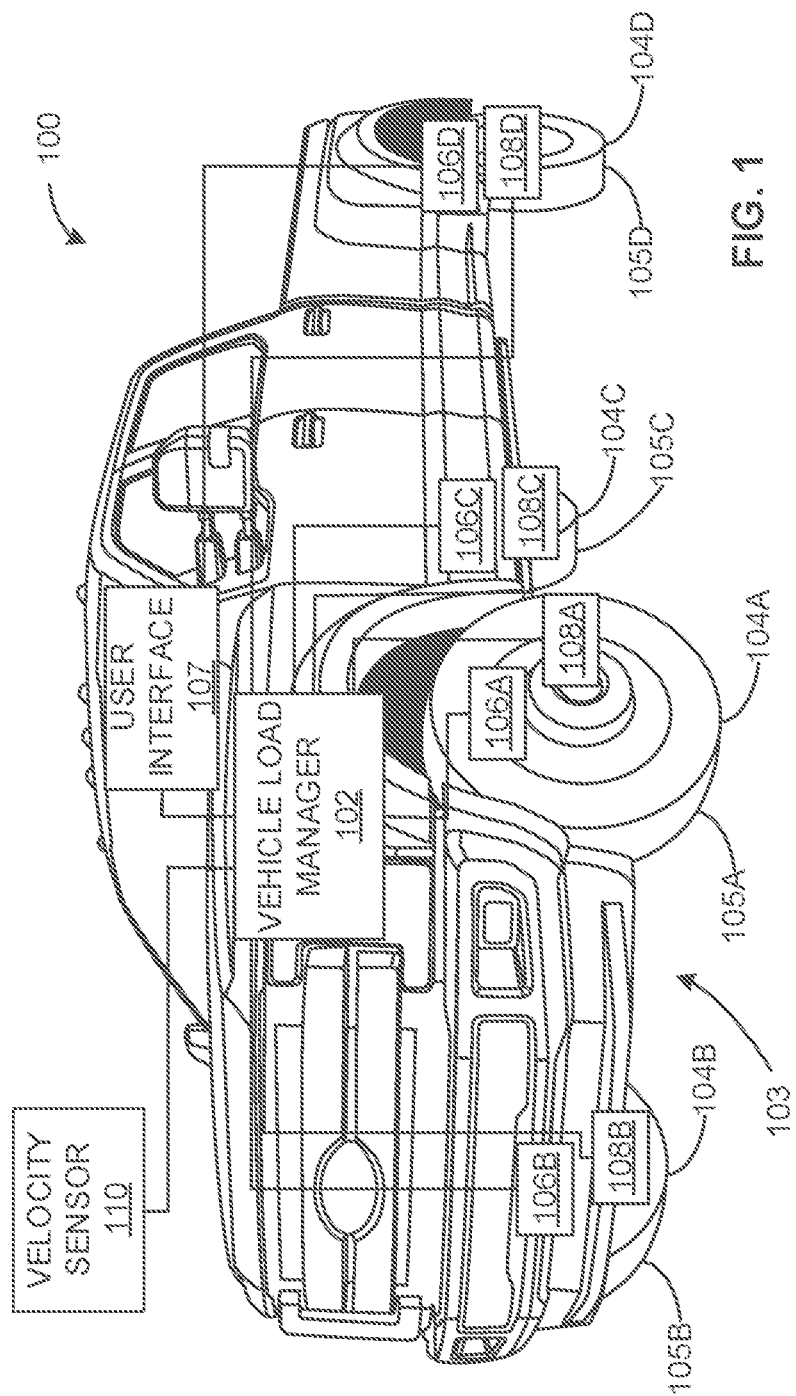
FIG. 1 is a perspective view of a vehicle in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

As used herein, the "weight" of a vehicle refers to the gross weight of a vehicle unless indicated otherwise. As used herein, the "load" on a vehicle refers to the difference between the gross weight of a vehicle and the curb weight of a vehicle (e.g., the weight of the vehicle hardware and consumables, etc.). The load on a vehicle typically includes the weight added by a user of a vehicle (e.g., the weight of the passengers of the vehicle, cargo loaded in the vehicle, etc.). As used herein, the "load condition" of a vehicle refers to the load on a vehicle as well as the distribution of the load on the vehicle. As used herein, the phrase "misloading a vehicle" and all variations thereof, refers to a load condition that adversely affects the performance of the vehicle, and can, for example, include exceeding the GAWR of one or both axles, exceeding a weight rating of a suspension assembly, unbalancing a weight distribution associated with the vehicle, etc.

As used herein, the term "contact patch area" and "footprint" are used interchangeably to refer to the area of the tires 105A, 105B, 105C, 105D in contact with the driving surface. While examples disclosed herein are described with reference to the contact patch area, other measurements can be substituted. For example, the contact patch area length along the longitudinal axis and/or the displaced volume associated with the deformation of the tire may be substituted for contact patch area in the examples disclosed herein.

Vehicle load measurement systems for consumer vehicles need to accurately measure the load on a vehicle when the vehicle is in motion and when the vehicle is stationary. As such, load estimation techniques that only work while the vehicle is in motion are not suitable for use with consumer vehicles. Vehicle load measurements based on measuring suspension properties often have significant error factors, which can decrease the accuracy of vehicle load measurements. Additionally, due to material and manufacturing deviations, load and/or weight estimations using readings from suspension-based load sensors must be calibrated for each vehicle during the manufacturing and/or assembly of the vehicle. For example, the sensor output of each suspension-based load sensor must be calibrated for the individual suspension of each manufactured vehicle. This process adds time and cost to the manufacturing and assembly of the vehicle. Additionally, because this process occurs during manufacturing, as the suspension wears during use and the properties of the system change, the accuracy of the calibration can begin to drift and introduce additional error into the weight measurement. Known suspension-based load sensors and load estimation techniques are typically open-loop and thus, do not incorporate feedback over time into the system to account for the properties of the suspension system changing over time. Accordingly, these prior art vehicle weight measurement systems can result in vehicle misloading. Accurate measurements of vehicle loads are required to ensure the vehicle is not misloaded. Misloading a vehicle can cause the vehicle to prematurely degrade and can reduce the effectiveness of vehicle safety systems.

Examples disclosed herein overcome the above-noted deficiencies by using dynamic load estimation techniques in conjunction with static load estimation techniques. Examples disclosed herein utilize sensor data from the wheels of the vehicle to estimate a load of a vehicle while the vehicle is in motion. In some examples disclosed herein, the wheel speed and vehicle speed are used to determine the load of a vehicle while the vehicle is in motion. In some examples disclosed herein, an accelerometer disposed in the tread of a vehicle tire can be used to estimate the contact patch area of the tire. In such examples disclosed herein, the contact patch area of the tire can be used to estimate a load of a vehicle. In some examples disclosed herein, the primary weight estimation system can make a first estimation using suspension-based sensors while the vehicle is stationary and the secondary weight estimation using wheel-based and/or tire-based sensors while the vehicle is in motion. In such examples, the secondary weight estimation system be used to calibrate the primary weight estimation system.

FIG. 1 is a perspective view of a vehicle 100 in which examples disclosed herein can be implemented. In the illustrated example of FIG. 1, the example vehicle 100 includes an example vehicle load manager 102, an example suspension system 103, an example first wheel 104A, an example second wheel 104B, an example third wheel 104C, an example fourth wheel 104D. The example wheels 104A, 104B, 104C, 104D include an example first tire 105A, an example second tire 105B, an example third tire 105C, and an example fourth tire 105D. In the illustrated example of FIG. 1, the example vehicle 100 includes an example first suspension-based sensor 106A, an example second suspension-based sensor 106B, an example third suspension-based sensor 106C, and an example fourth suspension-based sensor 106D. The vehicle 100 further includes an example user interface 107. The example wheels 104A, 104B, 104C, 104D include an example first wheel-based sensor 108A, an example second wheel-based sensor 108B, an example third wheel-based sensor 108C, and an example fourth wheel-based sensor 108D. In the illustrated example of FIG. 1, the vehicle 100 includes an example velocity sensor 110.

The vehicle 100 is a motorized wheel-driven (e.g., tire-driven, etc.) vehicle. In the illustrated example of FIG. 1, the vehicle 100 is a pick-up truck. In other examples, the vehicle 100 can be any type of wheeled vehicle, tired vehicle, and/or combination thereof (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle.

The vehicle 100 includes an example suspension system 103. The suspension system 103 can include an independent suspension (e.g., a wishbone suspension, etc.), a solid axle suspension (e.g., a leaf spring suspension, etc.) or a combination thereof (e.g., a front axle independent suspension, a rear axle dependent suspension, etc.).

The example wheels 104A, 104B, 104C, 104D each generally include a wheel rim and a corresponding one of the example tires 105A, 105B, 105C, 105D. During operation of the vehicle 100, the load of the vehicle 100 causes the tires 105A, 105B, 105C, 105D to deflect and flatten in contact with the driving surface. While in the illustrated example of FIG. 1, the vehicle 100 has two axles and four wheels, in other examples, the vehicle 100 can have any number of axles and wheels.

The suspension-based sensors 106A, 106B, 106C, 106D are sensors that are disposed on components of the suspension system 103 can determine the load of the vehicle 100. In the illustrated example of FIG. 1, the suspension-based sensors 106A, 106B, 106C, 106D are associated with the wheels 104A, 104B, 104C, 104D. For example, the suspension-based sensors 106A, 106B, 106C, 106D are sensors disposed and/or otherwise in contact with the portions of the suspension system associated with the wheels 104A, 104B, 104C, 104D. In such examples, the suspension-based sensors 106A, 106B, 106C, 106D can be ride height sensors, suspension displacement sensors, suspension force sensors, etc. In other examples, the suspension-based sensors 106A, 106B, 106C, 106D can be any other suitable type of sensors (e.g., a magnetoelastic sensor, a load cell, a strain gauge, an accelerometer, etc.). In some examples, the suspension-based sensors 106A, 106B, 106C, 106D enable the vehicle load manager 102 to estimate the load on the vehicle 100 when the vehicle is in motion (e.g., has a non-zero velocity) and when the vehicle is not in motion (e.g., has a velocity of zero, static, stationary, etc.). In the illustrated example of FIG. 1, the vehicle 100 includes the four suspension-based sensors 106A, 106B, 106C, 106D. In other examples, the vehicle 100 can include different numbers of suspension-based sensors (e.g., more than four sensors, less than four sensors, etc.). An example including less than four suspension-based sensors is described below in conjunction with FIG. 5.

The wheel-based sensors 108A, 108B, 108C, 108D are sensors associated with the respective wheels 104A, 104B, 104C, 104D to enable some or all of the tire properties of the tires 105A, 105B, 105C, 105D to be measured. For example, the wheel-based sensors 108A, 108B, 108C, 108D can be tire pressure sensors, tire accelerometers, wheel speed sensors, tire deflection sensors, etc. In some examples, the wheel-based sensors 108A, 108B, 108C, 108D are tire-based sensors. In some such examples, the wheel-based sensors 108A, 108B, 108C, 108D can be embedded in the interior tread of the corresponding one of the tires 105A, 105B, 105C, 105D and at any other suitable location. In other examples, the wheel-based sensors 108A, 108B, 108C, 108D can be disposed at any other suitable location in the wheels 104A, 104B, 104C, 104D, the tires 105A, 105B, 105C, 105D and/or any other suitable location of the vehicle 100 for measuring properties of the tires 105A, 105B, 105C, 105D.

The velocity sensor 110 measures the velocity of the vehicle 100. For example, the velocity sensor 110 can be implemented by a global positioning system (GPS) associated with the vehicle 100 (e.g., an integrated GPS, a GPS associated with a mobile device of the operator, a standalone GPS device, etc.). Additionally or alternatively, the velocity sensor 110 can be implemented by a speedometer of the vehicle 100, a tachometer of the vehicle 100, and/or any other suitable sensor associated with the vehicle 100. Additionally or alternatively, the velocity sensor 110 can be implemented by one or more of the wheel-based sensors 108A, 108B, 108C, 108D.

The vehicle load manager 102 enables the determination of the current load of the vehicle 100 and the calibration of the suspension-based sensors 106A, 106B, 106C, 106D. For example, the vehicle load manager 102 can receive information from the suspension-based sensors 106A, 106B, 106C, 106D, process the data, and generate an example first estimation of the load of the vehicle 100 via a first weight estimate technique. In some examples, the vehicle load manager 102 can receive information from the wheel-based sensors 108A, 108B, 108C, 108D, process the data, and generate an example second estimation of the load of the vehicle 100 via a second load estimation technique. In some examples, the vehicle load manager 102 can use dynamic load estimation techniques (e.g., the second load estimation technique, etc.) to calibrate the static load estimation techniques (e.g., the first load estimation technique, etc.).

In some examples, the vehicle load manager 102 can determine the weight of the vehicle by determining and summing the load carried by each of the wheels 104A, 104B, 104C, 104D. For example, the vehicle load manager 102 can determine the load carried by the first wheel 104A (e.g., via readings from the first suspension-based sensor 106A, via readings from the first wheel-based sensor 108A, etc.), the load carried by the second wheel 104B (e.g., via readings from the second suspension-based sensor 106B, via readings from the second wheel-based sensor 108B, etc.), the load carried by the third wheel 104C (e.g., via readings from the third suspension-based sensor 106C, via readings from the third wheel-based sensor 108C, etc.), and the load carried by the fourth wheel 104D (e.g., via readings from the fourth suspension-based sensor 106D, via readings from the fourth wheel-based sensor 108D, etc.). In such examples, the vehicle load manager 102 can sum each of the determined weights to determine the total weight of the vehicle 100. In other examples, the vehicle load manager 102 can determine the total weight carried on each of the axles and sum the determined loads to determine the total weight of the vehicle 100. In other examples, the vehicle load manager 102 can determine the weight carried by one of axles (e.g., the front axle, etc.) and the load weight carried by the wheels of the other axle(s) of the vehicle 100 (e.g., the third wheel 104C, the fourth wheel 104D, etc.).

In some examples, the vehicle load manager 102 an output information (e.g., an indication of the load, a warning about the load, etc.) to the user interface 107. In some examples, the vehicle load manager 102 can receive information input by the user via the user interface 107. In some examples, the vehicle load manager 102 can be implemented by the vehicle electronic control unit (ECU) and/or any other suitable computer associated with the vehicle 100. In other examples, the vehicle load manager 102 can be associated with any other suitable computing device (e.g., a mobile device associated with a user of vehicle 100, etc.) and/or combination of computing devices (e.g., partly via a computer associated with the vehicle 100, partly via another computer, etc.). An example implementation of the vehicle load manager 102 is described in greater detail below in conjunction with FIG. 2.

The user interface 107 enables a user of the vehicle 100 to receive and input information with the vehicle load manager 102 and other systems of the vehicle 100. For example, the user interface 107 can be implemented by a display of the vehicle 100. Additionally or alternatively, the user interface 107 can include one or more dash indicator(s), one or more button(s) on the dashboard or steering wheel, one or more speakers, one or more microphones, etc. In some examples, the user interface 107 can be implemented by a mobile device of the user (e.g., a mobile phone, a smartwatch, a tablet, etc.).

Figure 2:
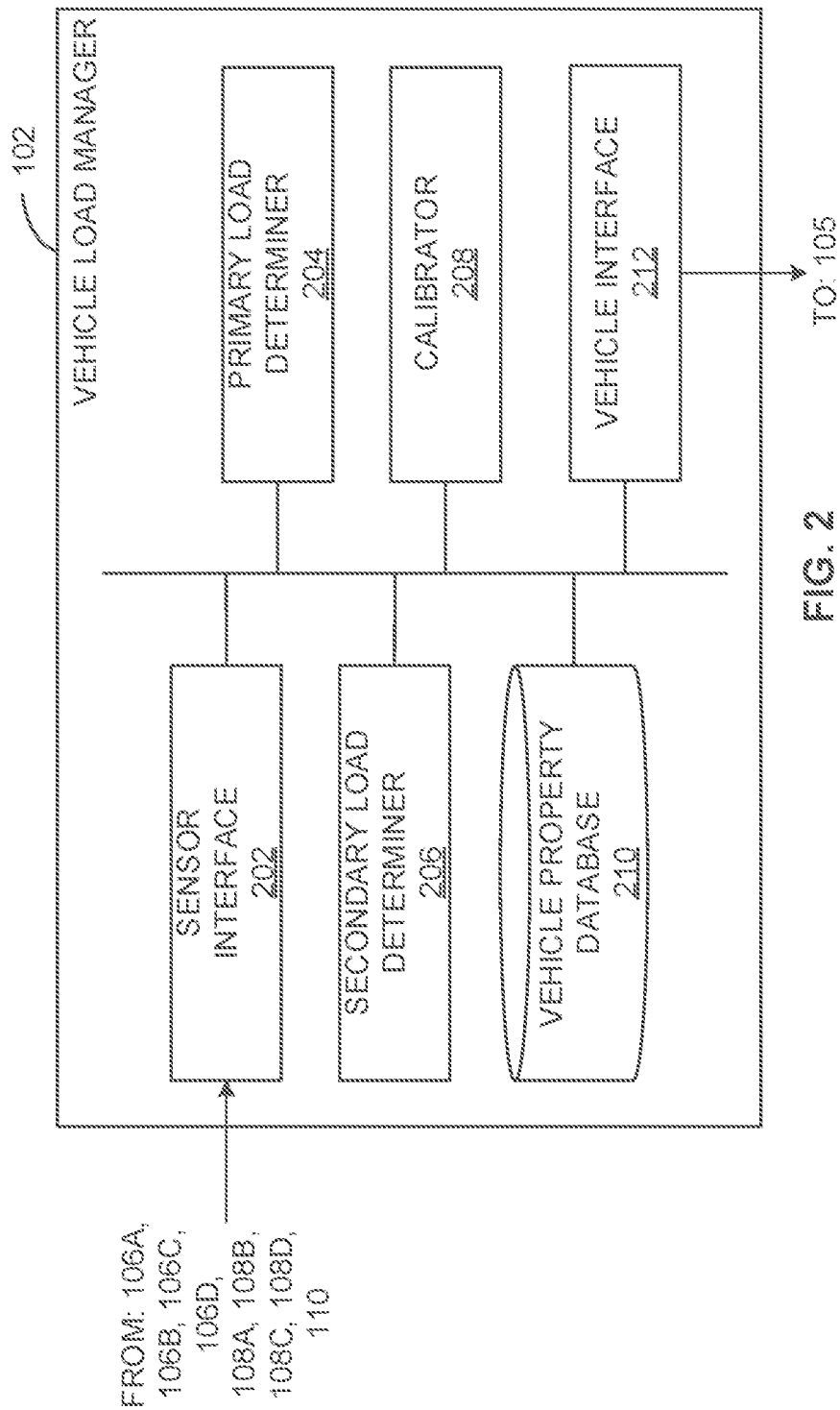
FIG. 2 is a block diagram of the vehicle load manager of FIG. 1.

FIG. 2 is a block diagram of the vehicle load manager 102 of FIG. 1. In the illustrated example of FIG. 2, the vehicle load manager 102 includes an example sensor interface 202, an example primary load determiner 204, an example secondary load determiner 206, an example calibrator 208, an example vehicle property database 210, and example vehicle interface 212.

The sensor interface 202 receives sensor data from the sensors 106A, 106B, 106C, 106D, 108A, 108B, 108C, 108D, 110 of the example vehicle 100. In some examples, the sensor interface 202 can receive sensor readings (e.g., data, etc.) from other sensors of the vehicle (e.g., other sensors associated with the wheels 104A, 104B, 104C, 104D, sensors associated with a hitch of the vehicle 100, sensors associated with a steering system of the vehicle 100, etc.). In some examples, the sensor interface 202 can transform the received sensor data from a machine-readable format (e.g., a voltage, a current, etc.) to a human-readable format (e.g., a string, a floating-point number, an integer, etc.). In some examples, the sensor interface 202 can receive data from the velocity sensor 110 to determine if the vehicle 100 is in motion.

The primary load determiner 204 estimates the load of the vehicle 100 based on data from the suspension-based sensors 106A, 106B, 106C, 106D. The primary load determiner 204 can estimate the load of the vehicle 100 while the vehicle 100 is stationary and while the vehicle 100 is in motion (e.g., while the vehicle has a non-zero velocity, etc.). For example, the primary load determiner 204 can determine the vehicle weight using ride height sensors based on a look-up table and/or a correlation curve. In such examples, the ride height of the vehicle 100 and the properties of the suspension (e.g., stiffness, etc.) can be used to determine the vehicle load. In some such examples, the look-up table and/or correlation curve can initially be generated based on an estimation of the suspension system properties (e.g., based on the mechanical and material properties of the suspension, etc.) and/or an initial calibration of the sensors 106A, 106B, 106C, 106D and the primary load determiner 204 during the manufacturing and assembly of the vehicle 100. In some examples, the primary load determiner 204 can be calibrated by the calibrator 208 using the estimations of the secondary load determiner 206. Additionally or alternatively, the primary load determiner 204 can estimate the weight of the vehicle 100 via any other suitable methods (e.g., suspension displacement, suspension load sensor, etc.).

The secondary load determiner 206 estimates the load of the vehicle 100 based on data from the wheel-based sensors 108A, 108B, 108C, 108D. The example secondary load determiner 206 can determine the weight of the vehicle 100 while the vehicle 100 is in motion. In some examples, the secondary load determiner 206 is not able to estimate the load on the vehicle 100 while the vehicle 100 is not in motion. For example, the secondary load determiner 206 can determine the load of the vehicle based on the rotational speed of the wheels 104A, 104B, 104C, 104D (e.g., determined based on the sensors 108A, 108B, 108C, 108D, etc.) and the velocity of the vehicle 100 (e.g., the velocity sensor 110 and/or another sensor of the vehicle 100, etc.). In such examples, the rolling radius of the wheels 104A, 104B, 104C, 104D is determined based on the ratio of the rotational speed of the wheels 104A, 104B, 104C, 104D to the velocity of the vehicle 100 or vice versa. In such examples, the rolling radius of the wheels 104A, 104B, 104C, 104D can be used to determine the tire deflection, which is proportional to the load on the vehicle 100. Additionally or alternatively, if the sensors 108A, 108B, 108C, 108D include accelerometers, the secondary load determiner 206 can use data from the sensors to estimate the size of the contact patch of the tires 105A, 105B, 105C, 105D. In such examples, the size of the contact portion of the tires 105A, 105B, 105C, 105D is proportional to the load on the vehicle 100. The operation of the secondary load determiner 206 is described in greater detail below in conjunction with FIG. 3.

The calibrator 208 calibrates the primary load determiner 204 based on the difference between the weight estimation of the primary load determiner 204 and the secondary load determiner 206. For example, the calibrator 208 can determine the difference between a first load estimation of the primary load determiner and the second load estimation of the secondary load determiner 206 captured concurrently with the first load estimation. For example, the calibrator 208 can determine the error associated with the primary load determiner 204 to increase the accuracy of subsequent weight estimations made by the primary load determiner 204. In some examples, the calibrator 208 can update the look-up table and/or the correlation curve associated the primary load determiner 204. In some examples, the calibrator 208 can continuously update the look-up table and/or the correlation curve associated with the primary load determiner 204 to ensure the primary load determiner 204 is properly calibrated for all potential loads on the vehicle 100 and to account for the changing properties of the suspension of the vehicle 100 over time due to wear on the vehicle 100.

The vehicle property database 210 stores data relating to the properties of the vehicle 100. For example, the vehicle property database 210 can include the look-up table and/or correlation curve associated with the primary load determiner 204. In some examples, the tire properties used by the secondary load determiner 206 can be stored in the vehicle property database 210.

The vehicle interface 212 enables the vehicle load manager 102 to interact with other components and/or systems of the vehicle 100. For example, the vehicle load manager 102 can cause the user interface 107 to display the first load estimation of the primary load determiner 204, the second load estimation of the secondary load determiner 206, and/or the calibration factor of the calibrator 208. In some examples, the vehicle interface 212 can cause the sensors 106A, 106B, 106C, 106D, 108A, 108B, 108C, 108D to calibrate based on the output of the calibrator 208.

While an example manner of implementing the vehicle load manager 102 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example primary load manager 204, the example secondary load manager 206, the example calibrator 208, the example vehicle property database 210 and/or, more generally, the example vehicle load manager 102 of FIG. 2 may be implemented by hardware, software, firmware and/or any combination of hardware, software and/or firmware. Thus, for example, any of the example sensor interface 202, the example primary load manager 204, the example, secondary load manager 206, the example calibrator 208, the example vehicle property database 210 and/or, more generally, the example vehicle load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example primary load manager 204, the example secondary load manager 206, the example calibrator 208, the example vehicle property database 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle load manager 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
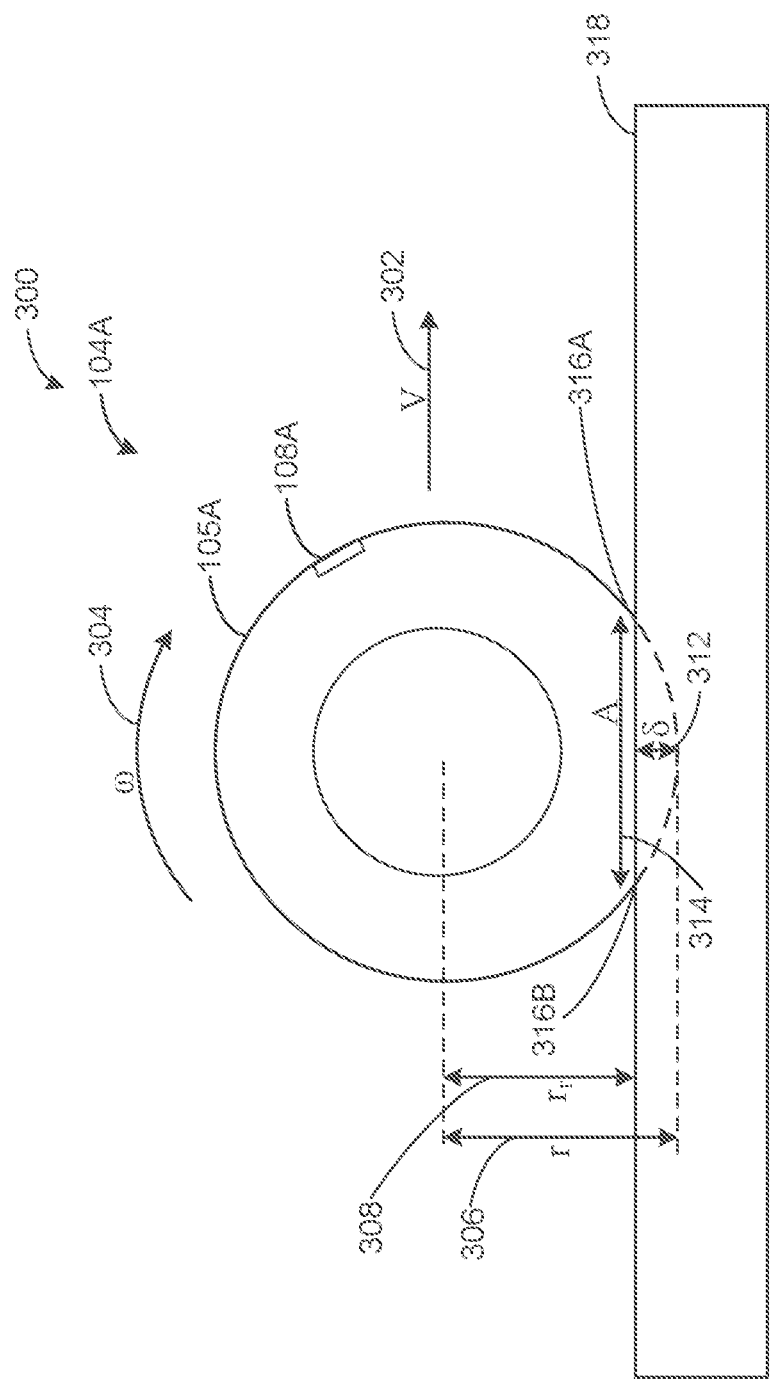
FIG. 3 is a simplified diagram of the first wheel and the first tire of FIG. 1 while in motion.

FIG. 3 is a simplified diagram 300 of the first wheel 104A of FIG. 1 while in motion. The example first wheel 104A includes the example first wheel-based sensor 108A of FIG. 1 embedded in the tread of the first tire 105A of the first wheel 104A. In the illustrated example of FIG. 3, the example wheel 104A is moving to the right at an example velocity 302 and is rotating at an example rotational speed 304. In the illustrated example of FIG. 3, the first wheel 104A has an example unloaded radius of 306, an example rolling radius 308, and an example tire deflection 312. The example first wheel 104A has an example contract area 314 that has an example leading edge 316A and an example trailing edge 316B with an example driving surface 318. While the sensor 108A of FIG. 1 is depicted in embedded in the tread of the first tire 105A in the diagram 300 of FIG. 3, in other examples, the sensor 108A can be at any other location in/on the first tire 105A and/or the first wheel 104A generally.

As used herein, the unloaded radius 306 refers to the radius of the first wheel 104A at the specified pressure and before being coupled to the vehicle 100. The unloaded radius 306 is a property of the first tire and can be stored in a memory associated with the vehicle load manager 102 (e.g., the vehicle property database 210, etc.). As used herein, the rolling radius 308 refers to the radius of the first wheel 104A while the wheel is rotating at the rotational speed 304.

In the illustrated example of FIG. 3, the rolling radius 308 of the first wheel 104A can be calculated based on the ratio of the velocity 302 to the rotational speed 304. Based on the rolling radius 308 and the unloaded radius 306, the vehicle load manager 102 can determine the tire deflection 312. For example, the tire deflection 312 can be determined based on the difference between the rolling radius 308 and the unloaded radius 306. Based on the tire deflection 312 and the stiffness of the first tire 105A, the vehicle load manager 102 can determine the load on the vehicle 100. In some examples, the stiffness of the first tire 105A is a function of the tire pressure, which can be determined by a sensor of the first wheel 104A (e.g., the sensor 108A, another sensor in the first wheel 104A, etc.), the geometry of the first wheel 104A and/or tire 105A, and/or the material of the first tire 105A. In some examples, the geometry of the first wheel 104A and material properties of the tire 105A can be stored in the vehicle property database 210.

In the illustrated example of FIG. 3, as the example wheel 104A rotates, the example first wheel-based sensor 108A comes into contact with the driving surface 318 at the example leading edge 316A and stops contact at the ground at the trailing edge 316B. In some examples, if the sensor 108A includes an accelerometer, the sensor 108A records an acceleration spike when the sensor 108A is in contact with the ground. As such, by recording the location of the acceleration extrema in the readings of the sensor 108A, the vehicle load manager 102 can determine the contact patch area 314 of the first wheel 104A based on the unloaded radius 306 and the rotational speed 304. The load on the vehicle 100 is proportional to the contact patch area 314, the tire pressure, and tire geometry. As such, after determining the contact patch area 314, the vehicle load manager 102 can determine the load of the vehicle 100 based on the contact patch area 314 and the properties of the first wheel 104A.

Figure 4B:
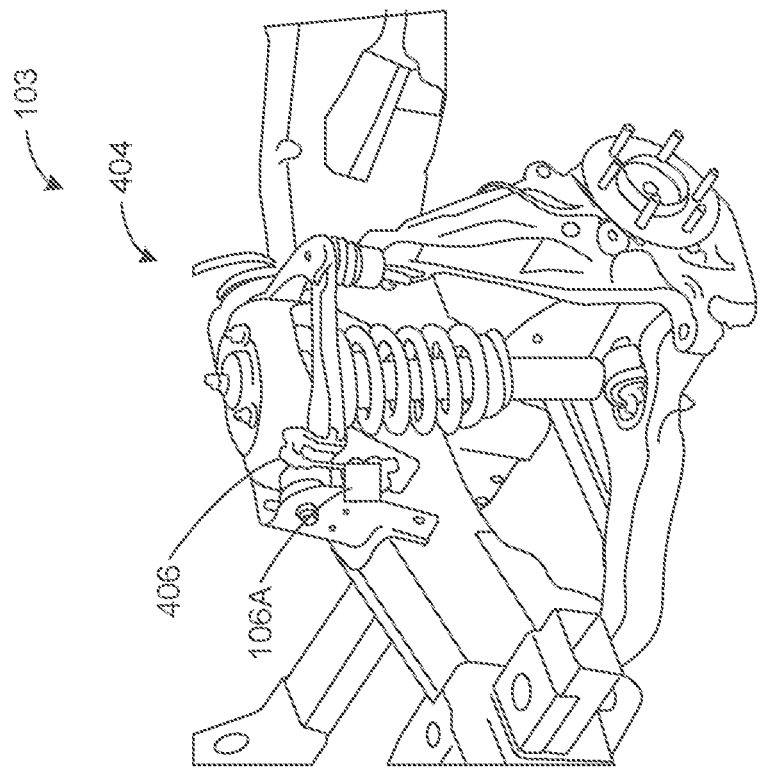
FIGS. 4A and 4B are perspective views of portions of the vehicle of FIG. 1 illustrating an implementation of the suspension-based sensors of FIG. 1.
Figure 4A:
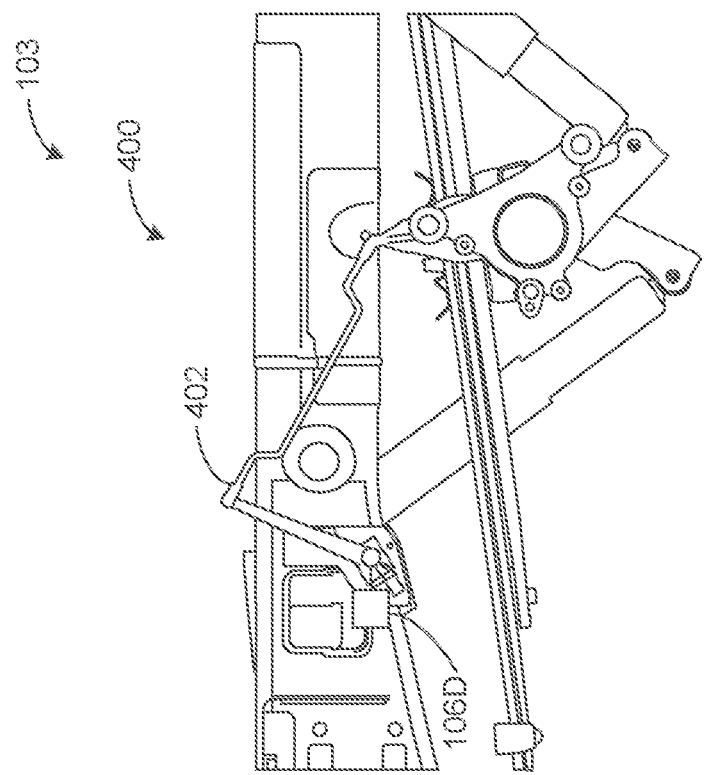

FIG. 4A is a perspective view of a rear portion 400 of the suspension system 103 of the vehicle 100 including an implementation of the fourth suspension-based sensor 106D. In the illustrated example of FIG. 4A, the rear portion 400 includes the fourth suspension-based sensor 106D and a first linkage 402. In the illustrated example of FIG. 4, the fourth suspension-based sensor 106D, via the first linkage 402, measures the rotational displacement of the rear portion 400 to determine the ride height and/or suspension displacement associated with the fourth wheel 104D. In some such examples, the rotational displacement of the rear portion 400 can be directly correlated with the ride height and/or suspension displacement. In other examples, the fourth suspension-based sensor 106D can be a linear displacement sensor and/or any other suitable type of sensor (e.g., a strain gauge, an optical sensor, etc.). In some examples, the first linkage 402 is absent. In such examples, the suspension-based sensor 106D can directly measure the rotational and/or linear displacement of the rear portion 400.

FIG. 4B is a perspective view of a front portion 404 of the suspension system 103 of the vehicle 100 including an implementation of the first suspension-based sensor 106A. In the illustrated example of FIG. 4B, the front portion 404 includes the first suspension-based sensor 106A and an example second linkage 406. In the illustrated example of FIG. 4B, the first suspension-based sensor 106A, via the second linkage 406, measures the rotational displacement of the front portion 404 to determine the ride height and/or suspension displacement associated with the first wheel 104A. In some such examples, the rotational displacement of the front portion 404 can be directly correlated with the ride height and/or suspension displacement. In other examples, the first suspension-based sensor 106A can be a linear displacement sensor and/or any other suitable type of sensor (e.g., a strain gauge, an optical sensor, etc.). In some examples, the second linkage 406 is absent. In such examples, the suspension-based sensor 106A can directly measure the rotational and/or linear displacement of the front portion 404.

Figure 5:
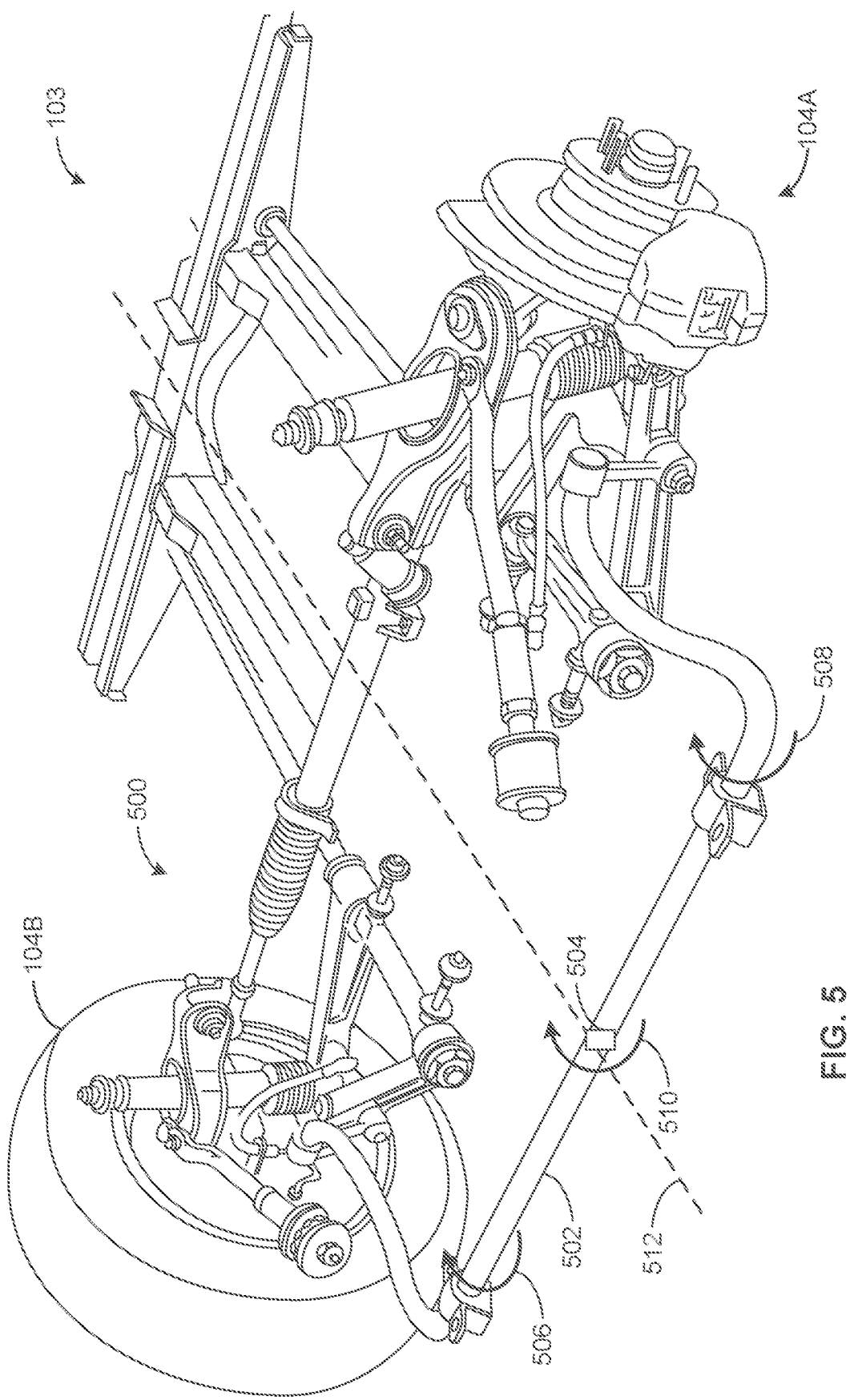
FIG. 5 is a perspective view of a portion of the vehicle of FIG. 1 illustrating an alternative implementation of the suspension-based sensors of FIG. 1.

FIG. 5 is a perspective view of the front axle 500 of the suspension system 103 of FIG. 1 illustrating an alternative implementation of the suspension-based sensors of FIG. 1. In the illustrated example of FIG. 5, the front axle 500 includes an example antiroll bar 502 and an example sensor 504. The example antiroll bar 502 has an example right rotation 506, an example left rotation 508, and an example center rotation 510. The example antiroll bar 502 is a component of the suspension system 103 that reduces the body roll of the vehicle 100 during maneuvering, driving on rough terrain, driving on a non-flat surface, etc. In the illustrated example of FIG. 5, the antiroll bar 502 acts as a torsion spring and increases the roll stiffness of the suspension system 103. In the illustrated example of FIG. 5, the antiroll bar 502 is currently in torsion due to different positions (e.g., ride height, etc.) of the first wheel 104A and the second wheel 104B, which corresponds to the right rotation 506 and the left rotation 508, respectively.

In the illustrated example of FIG. 5, the rotations 506, 508, 510 correspond to a displacement (e.g., a rotational displacement, linear displacement, etc.) of the corresponding portion of the antiroll bar 502 relative to a fixed portion of the vehicle 100 (e.g., the frame of the vehicle 100, etc.) and not to the relative twist of the antiroll bar 502. In the illustrated example of FIG. 5, the sensor 504 measures the center rotation 510 of the antiroll bar 502. In other examples, the sensor 504 can be disposed on the fixed portion of the vehicle. In the illustrated example of FIG. 5, the sensor 504 is a rotational displacement Hall-effect sensor. In other examples, the sensor 504 can be a linear displacement sensor and/or rotational displacement sensor and implemented by any other suitable means (e.g., optical, magnetic, piezoelectric, electric, strain, etc.).

In the illustrated example of FIG. 5, the antiroll bar 502 is geometrically and materially symmetrical about an example longitudinally oriented vehicle centerline 512. In the illustrated example of FIG. 5, the sensor 504 is disposed at the center of the antiroll bar 502. In other examples, the antiroll bar 502 is not symmetrical about the centerline 512. In such examples, the sensor 504 can be offset from the center of the antiroll bar 502, such that the antiroll bar 502 has the same torsional stiffness on both sides of the sensor 504.

By measuring the center rotation 510, readings from the sensor 504 can be used in place of readings from suspension-based sensors associated with the wheels 104A, 104B (e.g., the suspension-based sensors 106A, 106B, etc.). In such examples, the center rotation 510 is the average of the right rotation 506 and the left rotation 508. For example, if the axle 500 is symmetrically loaded (e.g., the wheels 104A, 104B are evenly loaded, etc.), the antiroll bar 502 is not in torsion and is rotationally displaced downward by the loading. In such examples, the rotations 506, 508, 510 are substantially equal. In other examples, if the axle is asymmetrically loaded (e.g., the wheels are not evenly loaded, etc.), the antiroll bar 502 is in torsion and is rotationally displaced by the loading. In such examples, the right rotation 506 and the left rotation 508 are not equal and the center rotation 510 is the average thereof.

In some examples, the total weight carried by the front axle 500 can be determined based on twice the product of the linear stiffness of the suspension system 103 and the center rotation 510. In some examples, the linear stiffness of the suspension system 103 can be empirically determined (e.g., during calibration of the vehicle load manager 102, etc.) and/or calculated based on the material and geometry of the suspension system 103. In some examples, the linear stiffness of the suspension system 103 can be expressed in an appropriate unit (e.g., pounds per degree, pounds per radian, newtons per degree, newtons per radian, etc.), depending on the units used by sensor 504 and/or the vehicle load manager 102.

In some examples, via use of the sensor 504, the total number of suspension-based sensors used by the vehicle 100 can be reduced when compared to the example of FIG. 4B. In such examples, the total number of sensors required to determine the load on the front axle 500 is halved from two sensors to one sensor. In such examples, the cost and weight of the vehicle 100 is correspondingly reduced.

While the example of FIG. 5 illustrates a front axle 500, a rear axle with an antiroll bar can be similarly instrumented to reduce the total number of sensors required to determine the weight carried by the rear axle. In other examples, a solid axle (e.g., the rear axle of the vehicle 100, etc.) can be instrumented with a linear displacement sensor disposed at the center of the solid axle. In such examples, the readings of the sensor can similarly be used to determine the loading on the solid axle, thereby the readings of the sensor to be used in place of readings from suspension-based sensors associated with the wheels of the solid axle (e.g., the suspension-based sensors 106C, 106D, etc.) As such, the total number of suspension-based sensors required to determine the weight on the vehicle 100 can be four (e.g., the suspension-based sensors 106A, 106B, 106C, 106D, etc.), three (e.g., the suspension-based sensors 106C, 106D and the sensor 504, etc.) or two (e.g., the sensor 504, a sensor associated with a rear axle of the vehicle 100, etc.).

Figure 6:
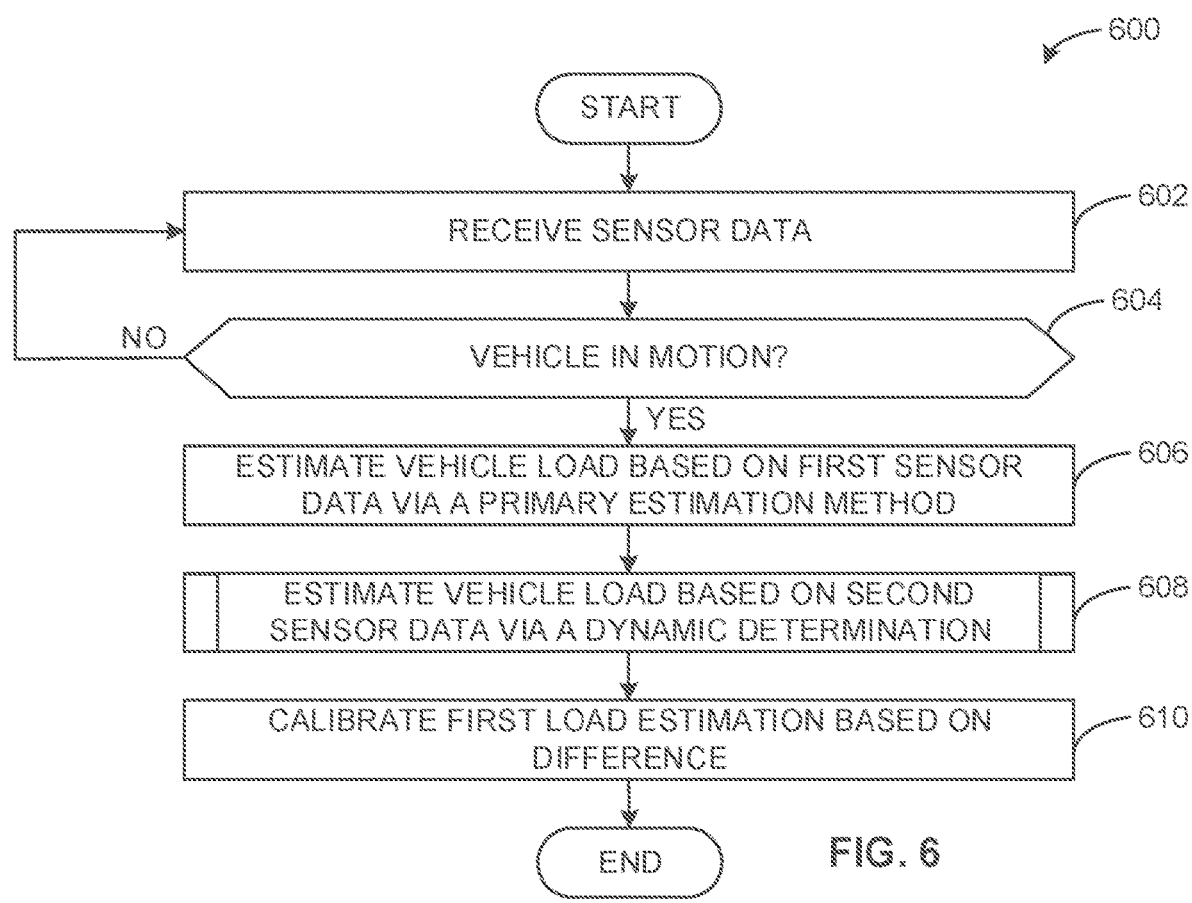
FIGS. 6-8 are flowcharts representative of machine-readable instructions which may be executed to implement the vehicle load manager of FIGS. 1 and 2.
Figure 7:
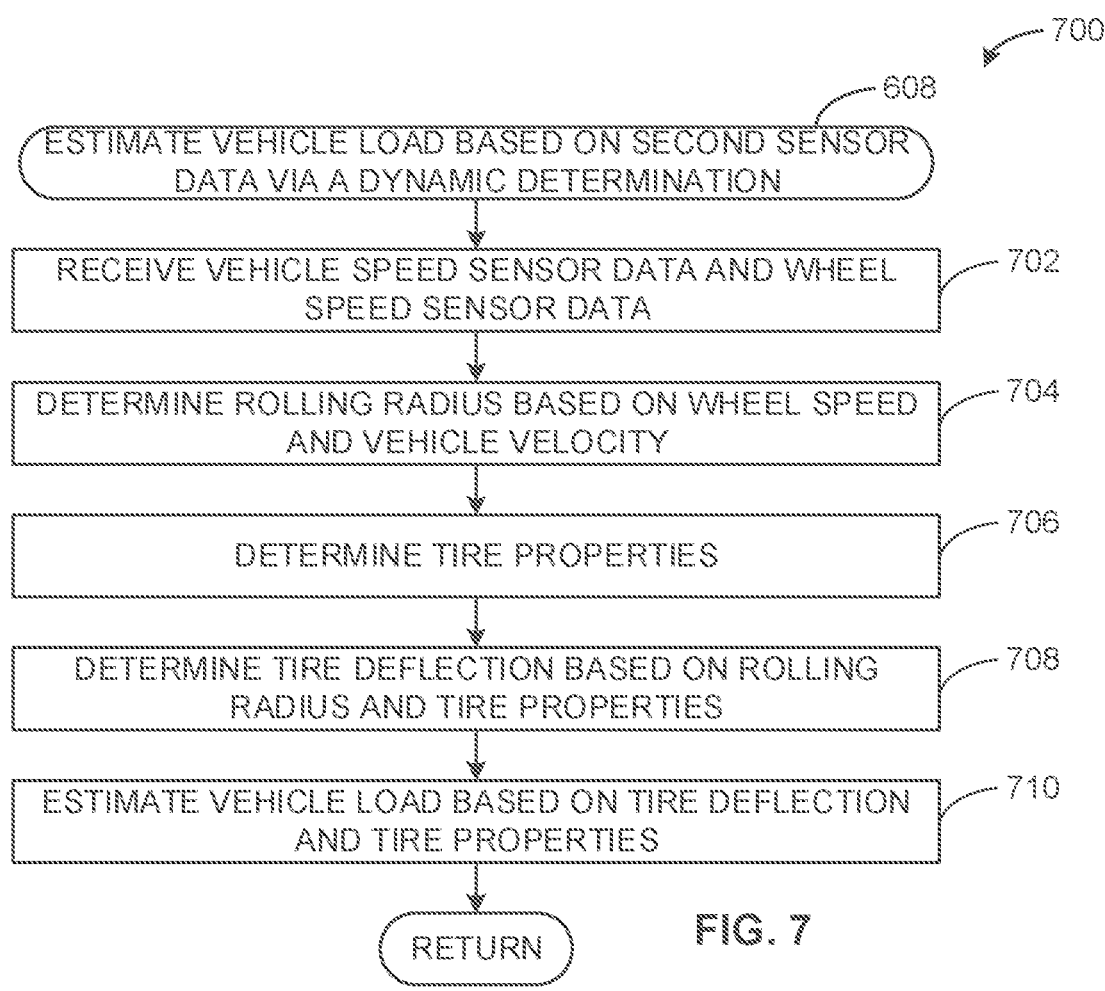
Figure 8:
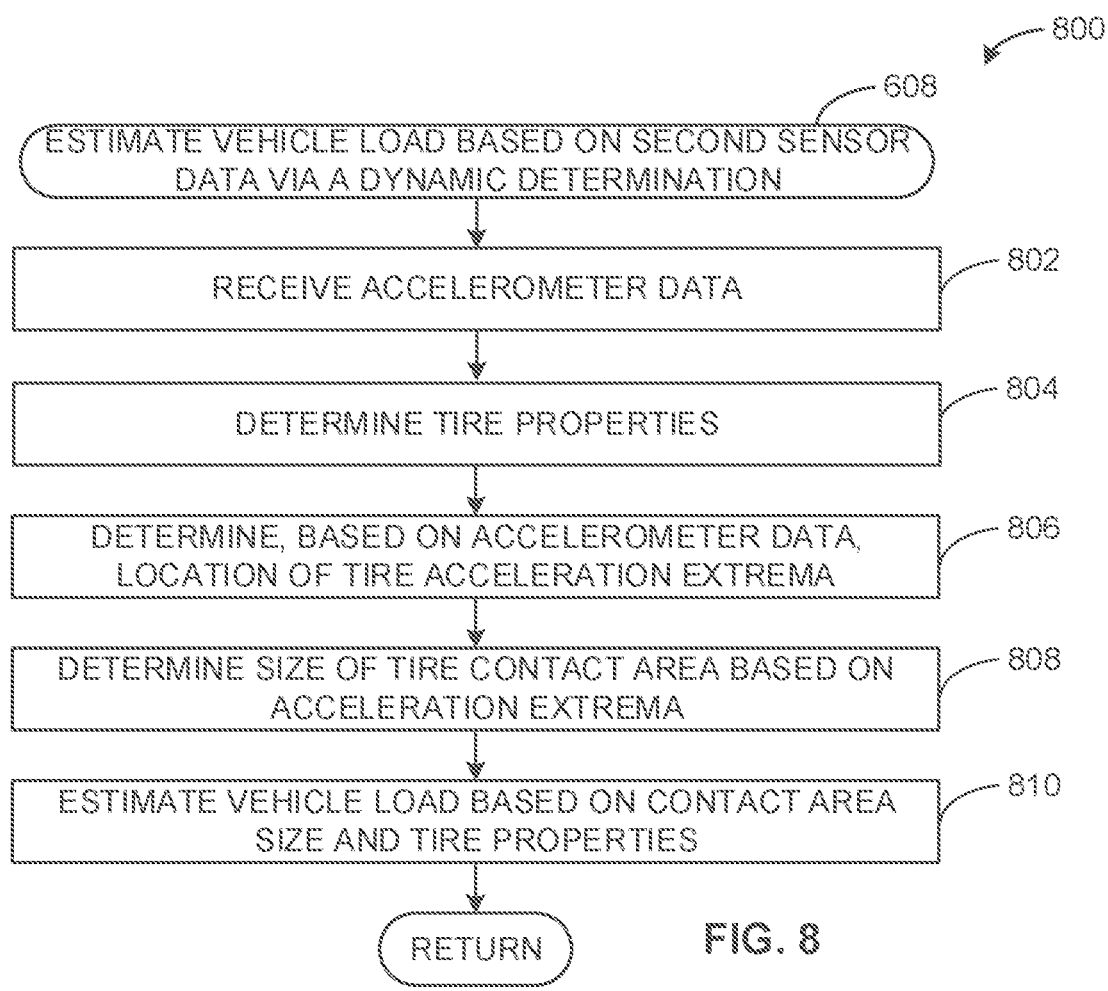

Flowcharts representative of example hardware logic, machine readable instructions, hardware implemented state machines, and/or any combination thereof for implementing the vehicle load manager 102 of FIGS. 1 and 2 is shown in FIGS. 6-8. The machine-readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6-8, many other methods of implementing the example vehicle load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 600 of FIG. 6 begins at block 604. At block 604, the sensor interface 202 receives sensor data. For example, the sensors interface 202 can retrieve data from the sensors 106A, 106B, 106C, 106D, 108A, 108B, 108C, 108D and/or other sensors associated with the vehicle 100. In some examples, the sensor interface 202 can transform the received data from a machine-readable format (e.g., a voltage value, a current value, etc.) into a human-readable format (e.g., a string, a floating-point number, an integer, etc.).

At block 604, the sensor interface 202 determines if the vehicle 100 is in motion. For example, the sensor interface 202 can determine if the vehicle 100 has a velocity. (e.g., via one of the sensors 106A, 106B, 106C, 106D, 108A, 108B, 108C, 108D, other sensors, etc.). For example, the sensor interface 202 can receive data from a global positioning system (GPS) associated with the vehicle 100, a speedometer associated with the vehicle 100, a tachometer associated with the vehicle 100, etc. If the sensor interface 202 determines the vehicle 100 is in motion, the program 600 advances to block 606. If the sensor interface 202 determines vehicle 100 is not in motion, the program returns to block 602.

At block 606, the primary load determiner 204 estimates the vehicle load based on first sensor data via a primary estimation method. For example, the primary load determiner 204 can estimate the load of the vehicle 100 based the suspension-based sensors 106A, 106B, 106C, 106D. For example, the primary load determiner 204 can correlate a ride height sensor reading, a suspension displacement, and/ or any other suitable sensor data with a load value with a look-up table and/or a curve stored in a memory of the vehicle 100 (e.g., the vehicle property database 210, etc.).

At block 608, the secondary load determiner 206 estimates the vehicle load based on second sensor data via a second estimation method. For example, the secondary load determiner 206 can estimate the load on the vehicle via a dynamic load estimation technique using data based by the sensor interface 202. In some examples, the secondary load determiner 206 can use the sensor readings for wheel-based sensors 108A, 108B, 108C, 108D to determine the sensor data via the second estimation method. An example program 700 to implement block 608 is described below in conjunction with FIG. 7. Another example program 800 to implement block 608 is described below in conjunction with FIG. 8.

At block 610, the calibrator 208 calibrates the primary estimation method based on the difference between the first load estimation and the second load estimation. For example, the calibrator 208 can determine the error of the primary estimation method based on the difference between the first load estimation made by the primary load determiner 204 during the execution of block 606 and the second load estimation made by the secondary load determiner 206 during the execution of block 608. In such examples, the error determined by the calibrator 208 can be used to correct future calculations made by the primary load determiner 204 and/or via the primary weight estimation method. In such examples, because the primary load estimation technique is functional while the vehicle 100 is in motion, the determination of the error by the calibrator 208 enables accurate weight estimation to be made while the vehicle 100 is stationary.

The program 700 of FIG. 5 begins at block 702. At block 702, the sensor interface 202 receives vehicle speed data and wheel speed sensor data. For example, the sensor interface 202 can receive the vehicle speed data and wheel speed data from the velocity sensor 110 and/or one or more of the wheel-based sensors 108A, 108B, 108C, 108D. In other examples, the sensor interface 202 can determine the vehicle speed data and wheel speed sensor data from any other suitable source.

At block 704, the secondary load determiner 206 determines the rolling radius 308 based on the rotational speed 304 and vehicle velocity 302. For example, the secondary load determiner 206 can determine the rolling radius 308 based on the ratio of the vehicle velocity 302 to rotational speed 304. In other examples, the secondary load determiner 206 can determine the rolling radius 308 by any other suitable means.

At block 706, the secondary load determiner 206 determines the tire properties. For example, the secondary load determiner 206 can determine the properties of the first wheel 104A by querying the vehicle property database 210. In some examples, the tire properties include the tire stiffness as a function of tire deflection. Additionally or alternatively, the secondary load determiner 206 can determine the tire properties based on data from the sensors 106A, 106B, 106C, 106D, 108A, 108B, 108C, 108D, 110, 504 and/or by any other suitable means.

At block 708, the secondary load determiner 206 determines the tire deflection 312 based on the rolling radius 308 and the tire properties. For example, the secondary load determiner 206 can determine the tire deflection 312 based on the difference between the unloaded radius 306 and the rolling radius 308. In other examples, the secondary load determiner 206 can determine the tire deflection 312 by any other suitable means.

At block 710, the secondary load determiner 206 estimates the vehicle weight based on the tire deflection 312 and the tire properties. For example, the secondary load determiner 206 can determine the vehicle weight based on the tire deflection 312 and the tire stiffness. In other examples, the secondary load determiner 206 can determine the vehicle weight by any other suitable method.

The program 800 of FIG. 8 begins at block 802. At block 802, the sensor interface 202 receives accelerometer data. For example, the sensor interface 202 can obtain accelerometer data from one or more of the sensors 108A, 108B, 108C, 108D. In such examples, the sensor interface 202 can receive continuous and/or high-frequency data from one or more of the sensors 108A, 108B, 108C, 108D as the vehicle is in motion. In other examples, the sensor interface 202 can receive accelerometer data from any other suitable source.

At block 804, the secondary load determiner 206 determines the tire properties. For example, the secondary load determiner 206 can query the vehicle property database 210 to determine the requested tire properties (e.g., the geometry of the first wheel 104A, the stiffness of the tire 105A, etc.). In other examples, the secondary load determiner 206 can determine the requested tire properties by any other suitable means.

At block 806, the secondary load determiner 206 determines, based on the received accelerometer data, the location of tire acceleration extrema. For example, the secondary load determiner 206 can identify a pressure increase associated with the sensor 108A coming into contact with the driving surface and a pressure decrease associated with the sensor 108A ending contact with the driving surface. In other examples, the secondary load determiner 206 can identify the extrema in any other suitable manner.

At block 808, the secondary load determiner 206 determines the size of the contact patch area based on acceleration extrema. For example, the secondary load determiner 206 can determine the size of the contact patch area based on the geometry of the tire, the rotational speed of the first wheel 104A, and the identified tire acceleration extrema. In other examples, the secondary load determiner 206 can determine the size of the contact patch area based on any other suitable method.

At block 810, the secondary load determiner 206 estimates the vehicle load based on the contact patch area size and tire properties. For example, the secondary load determiner 206 can determine load on the vehicle 100 as a function of the contact patch area size and the tire properties. For example, the secondary load determiner 206 can query a look-up table in the vehicle property database 210 to determine the corresponding vehicle load for the determined contact patch area and other tire properties (e.g., pressure, ambient temperature, etc.). In other examples, the secondary load determiner 206 can calculate vehicle load using one or more equations including coefficients determined based on the contact patch area size and the tire properties. In some examples, the relationship between the contact patch area size and the tire properties is linear. In other examples, the relationship between the contact patch area size and the tire properties can be non-linear.

Figure 9:
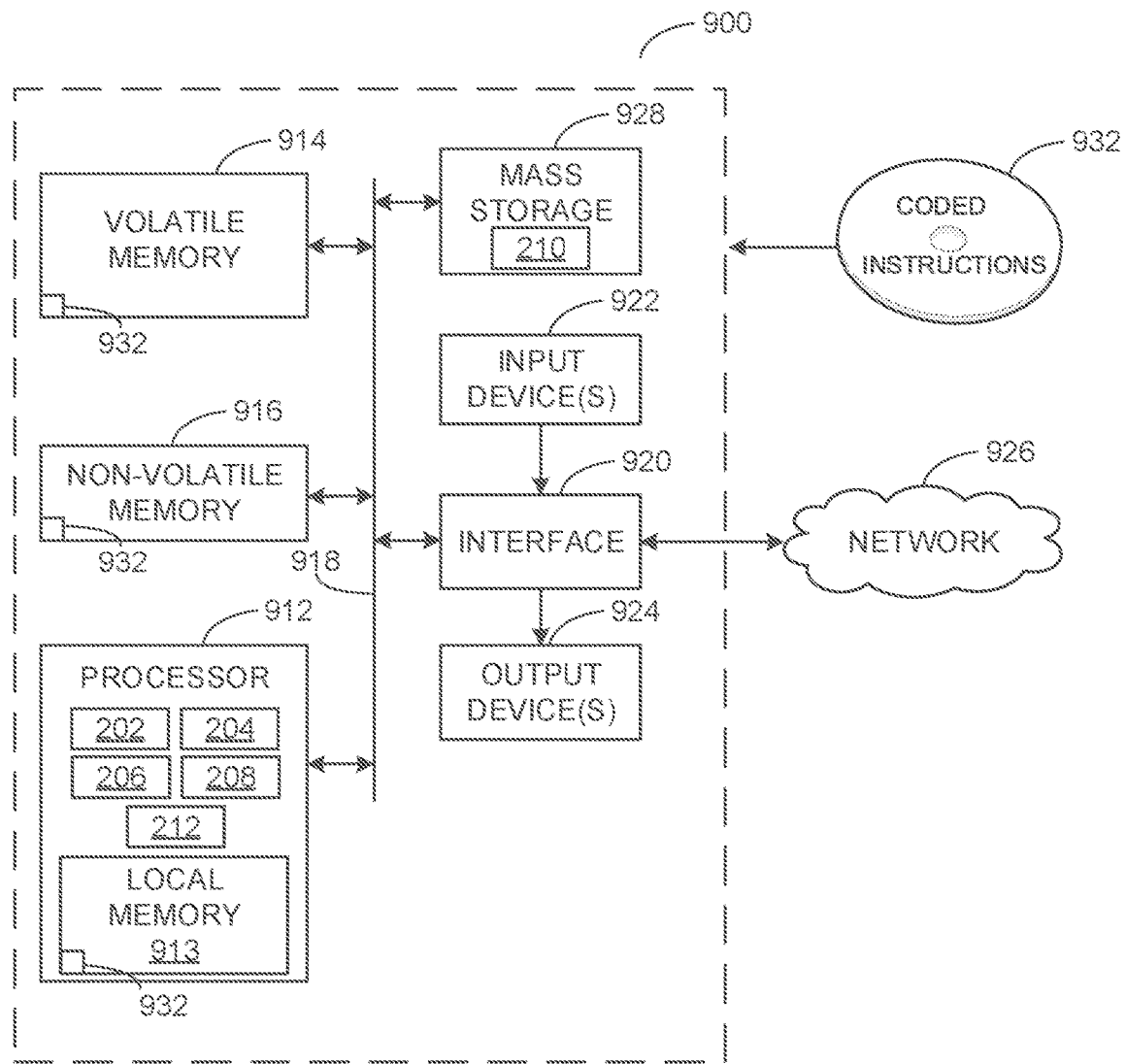
FIG. 9 is a block diagram of an example processing platform structured to execute the instructions of FIGS. 6-8 to implement the vehicle load manager of FIGS. 1 and 2.

FIG. 9 is a block diagram of an example processor platform 900 structured to execute the instructions of FIGS. 6-8 to implement the vehicle load manager of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example sensor interface 202, the example primary load determiner 204, the example secondary load determiner 206, the example calibrator 208, and the example vehicle interface 212.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random-Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD. In this example, the mass storage device 928 implements the example vehicle property database 210. In other examples, the volatile memory 914 and/or the non-volatile memory can implement the vehicle property database 210.

From the foregoing, it will be appreciated that example methods, apparatus and articles of manufacture have been disclosed that examples disclosed herein the accuracy of vehicle load estimations. The disclosed methods, apparatus and articles of manufacture improve the efficiency of using a computing device by enabling a primary vehicle load estimation technique to be calibrated continuously using a second load estimation technique. The disclosed methods, apparatus and articles of manufacture obviate the need to calibrate weight estimations during manufacture, which reduce manufacturing costs, and enable accurate load calculations over the of the vehicle as the suspension properties change due to wear. The disclosed methods, apparatus and articles of manufacture are accordingly directed to one or more improvement(s) in the functioning of a computer (e.g., the ECU of a vehicle, etc.) and the field of automobile parameter measurement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to methods and apparatus to calibrate a weight estimation are disclosed herein. Further examples and combinations thereof include the following:

Example 1 includes an apparatus comprising memory including stored instructions, and a processor to execute the instructions to determine, via a first sensor, a first load estimation of a vehicle corresponding to when the vehicle under a load condition, determine, via a second sensor, a second load estimation corresponding to when the vehicle is moving and under the load condition, and calibrate, based on a difference between the second load estimation and the first load estimation, an error of the first load estimation.

Example 2 includes the apparatus of example 1, wherein the processor executes the instructions to determine the second load estimation by determining a tire deflection of a tire of the vehicle when the vehicle is moving, and determining, based on the tire deflection and a stiffness of the tire, the second load estimation.

Example 3 includes the apparatus of example 2, wherein the processor executes the instructions to determine the tire deflection of the tire based on a rotational speed of the tire and a velocity of the vehicle.

Example 4 includes the apparatus of example 1, wherein the second sensor is an accelerometer embedded in a tire of the vehicle.

Example 5 includes the apparatus of example 4, wherein the processor executes the instructions to determine the second load estimation by determining a contact patch area of the tire, and determining, based on the contact patch area and a property of the tire, the second load estimation.

Example 6 includes the apparatus of example 1, wherein the first sensor is a ride height sensor.

Example 7 includes the apparatus of example 1, wherein the processor executes the instructions to determine the first load estimation and the second load estimation concurrently.

Example 8 includes a non-transitory computer readable medium comprising instructions, which, when executed cause a processor to determine, via a first sensor, a first load estimation of a vehicle corresponding to when the vehicle under a load, determine, via a second sensor, a second load estimation corresponding to when the vehicle is moving and under the load, and calibrate, based on a difference between the second load estimation and the first load estimation, an error of the first load estimation.

Example 9 includes the non-transitory computer readable medium of example 8, wherein the instructions, when executed, cause a processor executes to determine the second load estimation by determining, based on the second sensor reading, a tire deflection of a tire of the vehicle, and determining, based on the tire deflection and a stiffness of the tire, the second load estimation.

Example 10 includes the non-transitory computer readable medium of example 9, wherein the instructions, when executed, cause a processor to determine the tire deflection of the tire based on a wheel speed of the tire and a velocity of the vehicle.

Example 11 includes the non-transitory computer readable medium of example 8, wherein the second sensor is an accelerometer embedded in an interior tread of a tire of the vehicle.

Example 12 includes the non-transitory computer readable medium of example 11, wherein the instructions, when executed, cause a processor to determine the second load estimation by determining, based on the second sensor reading, a contact patch area of the tire, and determining, based on the contact patch area and a property of the tire, the second load estimation.

Example 13 includes the non-transitory computer readable medium of example 8, wherein the first sensor is a ride height sensor.

Example 14 includes the non-transitory computer readable medium of example 8, wherein the instructions, when executed, cause a processor to capture the first load estimation and the second load estimation concurrently.

Example 15 includes a method comprising determining, via a first sensor, a first load estimation of a vehicle corresponding to when the vehicle under a load, determining, via a second sensor, a second load estimation corresponding to when the vehicle is moving and under the load, and calibrating, based on a difference between the second load estimation and the first load estimation, an error of the first load estimation.

Example 16 includes the method of example 15, wherein determining the second load estimation includes determining, based on the second sensor reading, a tire deflection of a tire of the vehicle, and determining, based on the tire deflection and a stiffness of the tire, the second load estimation.

Example 17 includes the method of example 16, wherein the determining the tire deflection of the tire is based on a wheel speed of the tire and a velocity of the vehicle.

Example 18 includes the method of example 15, wherein the second sensor is an accelerometer embedded in an interior tread of a tire of the vehicle.

Example 19 includes the method of example 18, wherein determining the second load estimation includes determining, based on the second sensor reading, a contact patch area of the tire, and determining, based on the contact patch area and a property of the tire, the second load estimation.

Example 20 includes the method of example 15, wherein the first sensor is a ride height sensor. The following claims are hereby incorporated into this Detailed Description by this reference, with each claim standing on its own as a separate embodiment of the present disclosure.

What is claimed is:

1. An apparatus comprising:
   an axle assembly including:
      a suspension system including a component extending between a first wheel of a vehicle and a second wheel of the vehicle, wherein the component is an antiroll bar; and
      a sensor disposed on the component; and
   a processor to execute instructions to determine a load on the axle assembly based on an output of the sensor.

2. The apparatus of claim 1, wherein the antiroll bar is symmetrical about a centerline of the vehicle and the sensor is disposed at a center of the antiroll bar.

3. The apparatus of claim 1, wherein the antiroll bar is asymmetrical about a centerline of the vehicle, the sensor disposed at a location offset from a center of the antiroll bar, the antiroll bar having a same torsional stiffness (1) between the location and the first wheel, and (2) between the location and the second wheel.

4. The apparatus of claim 1, wherein the output of the sensor is indicative of a rotational displacement of the sensor relative to a fixed portion of the vehicle.

5. The apparatus of claim 1, wherein the processor is to determine the load on the axle assembly based on product of a linear stiffness of the suspension system between the first wheel and the second wheel and the output of the sensor.

6. A vehicle comprising:
   a first wheel;
   a second wheel;
   an axle assembly including:
      a suspension system including a component extending between the first wheel and the second wheel, wherein the component is an antiroll bar;
      a sensor disposed on the component; and
      a load manager to determine a load on the axle assembly based on an output of the sensor.

7. The vehicle of claim 6, wherein the antiroll bar is symmetrical about a centerline of the vehicle, and the sensor is disposed at a center of the antiroll bar.

8. The vehicle of claim 6, wherein the antiroll bar is asymmetrical about a centerline of the vehicle, the sensor disposed at a location offset from a center of the antiroll bar, the antiroll bar having a same torsional stiffness (1) between the location and the first wheel, and (2) between the location and the second wheel.

9. The vehicle of claim 6, wherein the output of the sensor is indicative of a rotational displacement of the sensor relative to a fixed portion of the vehicle.

10. The vehicle of claim 6, wherein the component is a solid axle, and the sensor is disposed on a center of the solid axle.

11. The vehicle of claim 6, wherein the load manager is to determine a load on the axle assembly based on a product of a linear stiffness of the suspension system and the output of the sensor.

12. A non-transitory computer readable medium comprising instructions, which, when executed cause a processor to:
    determine, via an output of a sensor, a displacement of an element extending between a first wheel of an axle assembly of a vehicle and a second wheel of the axle assembly, wherein the element is an antiroll bar; and
    determine a load on the axle assembly based on the displacement.

13. The non-transitory computer readable medium of claim 12, wherein the instructions, when executed, cause the processor to determine the load on the axle assembly based on the displacement and a linear stiffness of a suspension system associated with the axle assembly.

* * * * *